(12) United States Patent
Yoshino

(10) Patent No.: US 6,403,668 B1
(45) Date of Patent: *Jun. 11, 2002

(54) FOAM MATERIALS AND FOAM PRECURSOR MATERIALS

(75) Inventor: Masao Yoshino, Toyota (JP)

(73) Assignee: Neo-Ex Lab, Inc., Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,779

(22) Filed: May 28, 1999

(51) Int. Cl.$^7$ .................................................. C08J 9/10
(52) U.S. Cl. ...................................... 521/178; 521/135
(58) Field of Search .................................. 521/135, 178

(56) References Cited

U.S. PATENT DOCUMENTS

| | | | |
|---|---|---|---|
| 3,282,863 A | * 11/1966 | Carey et al. ................. | 521/178 |
| 5,274,006 A | * 12/1993 | Kagoshima et al. ......... | 521/135 |
| 5,631,304 A | 5/1997 | Hasegawa ..................... | 521/94 |
| 5,708,042 A | 1/1998 | Hasegawa ..................... | 521/94 |
| 5,755,486 A | 5/1998 | Wycech ........................ | 296/188 |
| 5,888,600 A | 3/1999 | Wycech | |
| 6,103,784 A | 8/2000 | Hilborn et al. | |
| 6,165,588 A | 12/2000 | Wycech | |
| 6,218,442 B1 | 4/2001 | Hilborn et al. | |
| 6,311,452 B1 | 11/2001 | Barz et al. | |

FOREIGN PATENT DOCUMENTS

| | | |
|---|---|---|
| EP | 0469550 A2 | 7/1991 |
| GB | 2200357 A | 8/1988 |
| JP | 55125126 A | 9/1980 |
| JP | 08198995 A | 8/1995 |

OTHER PUBLICATIONS

"Handbook of Epoxy Resins" By Lee Et Al, McGraw Hill Pub. Reissue 1981 p. 4–66.*
Database WPI; Section CH. Week 199335, Derwent Publications LTD., London, GB; Class A21, AN 1993–278380 XP002129453 & JP 05 194780 A (Nippon Zeon KK), Aug. 3, 1999 *Abstract*.
Patent Abstracts of Japan: vol. 004, No. 042 (C–005), Apr. 2, 1980 & JP 55 016073 A (Sunstar Giken KK), Feb. 4, 1980 *abtract*.

* cited by examiner

*Primary Examiner*—Morton Foelak
(74) *Attorney, Agent, or Firm*—Brobeck, Phleger & Harrison LLP

(57) ABSTRACT

Foam precursor materials are taught comprising an epoxy resin having an epoxy equivalents value of about 300–4000, a curing agent and a foaming agent. The foam precursor materials may be expanded and cured by heat to form foam materials that exhibit excellent rigidity. The resulting foam materials may have a compression strength of about 200–2000 Kgf and a density of about 0.20 to 0.40 grams per cubic centimeter.

33 Claims, No Drawings

FOAM MATERIALS AND FOAM PRECURSOR MATERIALS

BACKGROUND OF THE INVENTION

1. Field of the Invention

The present invention relates to epoxy resin compounds that can be used as foam precursor materials as well as high rigidity foam materials formed from curing and expanding such foam precursors materials.

2. Description of the Related Art

Various types of foams have heretofore been formed from a variety of resin materials. Foams are generally lightweight and provide good space filling properties and therefore are useful as packing materials. For example, foam materials have been utilized to fill hollow sections within automobile body parts, such as pillar structures, in order to prevent or reduce the transmission of exterior sounds into the interior of the vehicle. Thus, such foam materials can increase the overall soundproofing qualities of the vehicle. Recently, foam precursor materials have come into use, thereby simplifying the process for disposing foam materials in hollow spaces.

Foam materials with such space filling properties are presently used merely for the purposes of soundproofing and anti-vibration, but such foam materials do not have useful structural and mechanical qualities.

SUMMARY OF THE INVENTION

It is, accordingly, one object of the present teachings to provide improved foam precursor materials and foam materials.

Preferably, foam precursor materials contain at least one epoxy resin compound, at least one curing compound and at least one foaming compound. Other additives also may be included in the foam precursor materials, such as reinforcing materials, thermoplastic resins and thermosetting resins. In one particular aspect of the present teachings, foam precursor materials are taught that have long shelf lives without losing viability. For example, such foam precursor materials may be stored for six months and then expanded and cured to form a foam material, without significant degradation in performance.

In another aspect of the present teachings, methods are taught for forming the foam precursor materials into useful structures and for curing the foam precursor materials to form the foam material. Preferably, heat is used to expand and cure the material.

In another aspect of the present teachings, the foam materials can be used to fill hollow interiors of vehicle structural parts. Preferably, such foam materials have high rigidity and are useful soundproofing materials.

Other objects, features and advantages of the present invention will be readily understood after reading the following detailed description together with the claims.

DETAILED DESCRIPTION OF THE INVENTION

In one preferred aspect of the present teachings, a foam precursor material includes an epoxy resin having an epoxy equivalents value of 300–4000, a curing agent and a foaming agent. Preferably, this foam precursor material is curable and expanded by heat. The curing agent preferably has a curing temperature of about 100–200° C. The "epoxy equivalents value" is defined herein as the epoxy resin molecular weight (g/mole) per epoxy group. For example, an epoxy resin molecule having a molecular weight of 1000 g/mole and having 2 epoxy groups in the molecule has an "epoxy equivalents" value of 500.

The foam precursor material also may contain at least one type of thermoplastic resin selected from vinyl acetate and ethylene copolymer, ethylene and alkyl acrylate copolymer and/or polyethylene resin. Further, the foam precursor material also may contain a reinforcing material such as glass, metal and/or ceramic.

Preferably, the foam precursor material can be prepared by (1) heating and melting the epoxy resin, (2) adding the curing agent, foaming agent and any other desired additives to the molten epoxy resin, and (3) kneading the mixture. The curing and foaming agents are preferably handled at a temperature below the respective curing and foaming temperatures.

These foam precursor materials can be utilized to fill a vehicle structural part by disposing the foam precursor material in a hollow section of the vehicle part and heating the vehicle part to cure and expand the foam precursor material, thereby filling the hollow section with the foam. Using the foam precursor materials of the present teachings, results in a vehicle part having a highly rigid foam material disposed inside the vehicle part.

Although not wishing to be bound by theory, the foaming agent in foam precursor material is understood to decompose during heating to form a porous structure and at the same time, the epoxy cures to produce a foam material. Because an epoxy resin is utilized as the resin component, the resulting foam material possesses the properties of the epoxy resin. Thus, a foam material can be made from a lightweight epoxy resin and have excellent mechanical properties, chemical properties and electrical insulating properties.

Further, the foam precursor material can be formed into useful solid shapes. Consequently, handling of the foam precursor material is facilitated and use of the foam precursor material to fill hollow vehicle parts with foam material is simplified. That is, the foam precursor material can be formed into a shape that is particularly suited for the shape of the hollow space that will be filled. The foam precursor material is then inserted into the hollow space and expanded and cured. Preferably, using preferred foam precursor material shapes minimizes the amount of unfilled space within the hollow space after the foam precursor material is expanded and cured.

Each of the additional features and method steps disclosed above and below may be utilized separately or in conjunction with other features and method steps to provide foam precursor materials and foam products, as well as methods for making and using both compositions. Representative examples of the present invention, which examples utilize many of these additional features and method steps in conjunction, will now be described in further detail. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention.

I. Epoxy Resins

The foam precursor material preferably contains an epoxy resin as the resin component. Epoxy resins that are preferably used in the foam precursor material have an epoxy equivalents value of about 300–4000.

While not wishing to be bound by theory, if the epoxy resin has less than about 300 epoxy equivalents, the reactivity may be too high, thereby diminishing some of the useful foam properties, due to burning during the curing reaction. Generally speaking, molding of the foam precursor material becomes more difficult to perform as reactivity increases and melting points are reduced. Therefore, use of epoxies having less than 300 epoxy equivalents could result in certain disadvantages, such as a shorter shelf life of the foam precursor material and restrictions as to the types of curing agents that can be used.

Conversely, if the epoxy has more than about 4000 epoxy equivalents, the reactivity may be decreased, thereby resulting in less reliable curing and reduced hardness and adhesion of the foam. Resins with such epoxy equivalents generally have high melting points, which therefore requires high temperatures to mix the additives during the production of the foam precursor materials. Consequently, it may be necessary to select additives that do not decompose at such high temperatures, thereby limiting the types of additives that can be used.

In contrast, if epoxy resins having about 300–4000 epoxy equivalents are utilized, suitable curing reactivity and melting points are realized. Therefore, foams having satisfactory rigidity that are well suited for production of foam precursor materials can be prepared. More preferably, the epoxy resin contains about 500–2500 epoxy equivalents and most preferably, contains about 500–1000 epoxy equivalents.

Epoxy resins having suitable epoxy equivalents are not restricted to a single type of epoxy resin. Rather, combinations of epoxy resins also may be used. Representative epoxy resins include, but are not limited to, glycidyl ether, glycidyl ester, glycidyl amine and alicyclic. Other types of epoxy resins may be used. In particular, bisphenol A, bisphenol F, brominated bisphenol A, hydrogenated bisphenol A, bisphenol S, bisphenol AF, biphenyl, naphthalene, fluorene, phenol novolac, ortho-cresone novolac, DPP novolac, trifunctional, tris-hydroxyphenylmethane, tetraphenolethane and other glycidyl ether types are preferred. Most preferably, bisphenol A, brominated bisphenol A, hydrogenated bisphenol A are used as the epoxy resin.

Further, Epotote® manufactured by Toto Kasei, K.K. and Epikote® manufactured by Yuka Shell Epoxy Co. may be used as the epoxy resin.

II. Curing Agents

The curing agent is defined herein as a compound or composition of matter that is capable of curing epoxy resins. Preferably, the curing agent can co-exist at room temperature or usual storage temperatures with the epoxy resin in a precursor form without reacting with the epoxy resin, while at the same time, maintaining its curing reactivity. The curing agent preferably cures the epoxy resin at a temperature above the melting point of the epoxy resin, because the curing reactivity of the curing agent should not be diminished when the epoxy resin is melted during production, and in particular during the kneading, molding and other production steps to prepare the foam precursor material.

Preferably, the curing agent retains sufficient reactivity during the production and storage of the foam precursor material in order to cure the epoxy resin when desired. Therefore, while some limited curing of the epoxy resin may occur during the production and storage of the foam precursor material, such curing should not substantially affect the curing reactivity of the curing agent. Thus, in some situations, the epoxy resin may be semi-cured before the foam material is produced from the foam precursor material. However, a curing agent is preferably selected that can exist without significantly curing the epoxy resin at temperatures above the melting temperature of the epoxy resin, but below the curing temperature for the curing agent.

In particular, the curing agent also preferably has low reactivity with the epoxy resin when stored at room or usual storage temperatures in order to allow the foam precursor material to be stored for a long-term. The curing agent is preferably selected after consideration of the epoxy resin that will be utilized in order to minimize the possibility of immediate curing, because the sudden promotion of a curing reaction can sometimes impede foaming. Preferably, a curing agent is utilized that initiates curing in the temperature range of about 100° C. to 200° C. More preferably, the curing temperature is from about 130° C. to 180° C.

If an epoxy resin having 300–4000 epoxy equivalents and a curing agent having a curing temperature of 100–200° C. are used, the shelf life of the foam precursor material (the state in which curing reactivity is preserved) can be maximized. For example, a useful shelf life may be six months or longer.

Preferred curing agents include polyaddition type, catalyst type and condensation type curing agents. The polyaddition type curing agents include, but are not limited to, polyamine-based dicyandiamide and the acid anhydride-based methyl nadic acid anhydride. The catalyst type curing agents include, but are not limited to, imidazole-based 2-methylimidazole, 2-ethyl 4-methylimidazole and 2-heptadecyl imidazole, Lewis acid-based monoethylamine boron trifluoride, piperazine boron trifluoride and other related compounds. Specifically, Amicure® (a product of Ajinomoto), amine-based curing agents, such as dicyandiamide, imidazole-based curing agents including Curazole® (a product of Shikoku Kasei) and Epicure® (a product of Yuka Shell), monoethylamine trifluoride complexes and other related compounds may be used. PN-23 (a product of Ajinomoto), an amine-based curing agent, and AH-62 (a product of Ajinomoto), an imidazole-based curing agent are particularly preferred.

The amount of curing agent used in the foam precursor materials will differ depending on the epoxy equivalents of the epoxy resin. Generally, an amount of curing agent is utilized that will effectively cure the epoxy resin. Preferable amounts are 1–25 parts by weight to 100 parts by weight of the epoxy resin and more preferably 1–10 parts by weight.

III. Foaming Agents

Preferably, the foaming agent decomposes and expands at a temperature that is higher than the melting point of the epoxy resin that is used and does not decompose during the production of the foam precursor material, i.e. when the epoxy resin containing the curing agent is in a molten state. Production of foam precursor materials may require kneading, molding and melting the epoxy resin and curing agent. Thus, the foaming properties of the foaming agent are preferably maintained during these production steps. As mentioned above, the molten state of the epoxy resin is sufficient if it is in a molten state allowing the curing reactivity between the epoxy resin and the curing agent to be substantially maintained. The foaming agent must also exist in the molten state of the epoxy resin while substantially maintaining its foaming properties.

Although a reasonable amount of decomposition and foaming during the production of the foam precursor material can be expected, the foaming agent preferably does not significantly decompose during the production of the foam precursor material.

A foaming agent is selected that decomposes, and thus expands the epoxy resin, in a prescribed heating temperature range, depending on the curing agent used. The temperature range in which the curing agent can cure the epoxy resin should preferably overlap the temperature range in which the foaming agent decomposes and expands. The two temperature ranges are not required to completely overlap, as it is sufficient for the two temperature ranges to partially overlap. Specifically, the foaming (decomposition) temperature is preferably 100° C. or higher, and more preferably 120° C. or higher.

Preferably, organic decomposing-type foaming agents are utilized. For example, azodicarbonamide, azobisformamide, azobisisobutyronitrile, barium azodicarboxylate, N,N'-dinitrosopentamethylene tetramine, N,N'-dinitroso-N,N'-dimethylterephthalamide, paratoluenesulfonyl hydrazide, benzenesulfonyl hydrazide, 4,4'-oxybenzenesulfonyl hydrazide and other related compounds may be used. Any one or a combination of two or more of these foaming agents may be used. Azodicarbonamide is particularly preferred.

The foaming agent is preferably added in an amount to provide a foaming ratio of about 2–10 times, and more preferably about 2–6 times. That is, the amount of foaming agent utilized will produce a foam material having a volume 2–10 times larger than the volume of the foam precursor material, and more preferably about 2–6 times larger. While specific amounts will depend upon the particular epoxy resin that is selected, the foaming agent may be added at about 0.5–15 parts by weight to 100 parts by weight of the epoxy resin and more preferably 0.5–10 parts by weight.

IV. Other Additives

Various other additives may be added to the foam precursor material, such as other resin components including, for example, thermosetting resins and/or thermoplastic resins, inorganic additives including, for example, calcium carbonate, talc or mica, reactive dilutive compositions, curing accelerators, foaming aids, flame retardants, coloring agents and reinforcing materials (in powder form, chip form, fiber form, bead form, etc.) including, for example, glass, metal, ceramic or similar materials.

A thermosetting resin, other than an epoxy resin, may be added, including for example, polyester resins, melamine resins, urea resins and phenol resins. If such thermosetting resins are used, the amount of thermosetting resin can be appropriately determined based upon on the curing agent. If a thermoplastic resin is added, the resulting foam is generally more resilient than when a thermosetting resin alone is used. Thus, by changing the amount of thermoplastic resins and thermosetting resins that are included in the foam precursor material, foam materials having different qualities may be produced. For example, adding such additives can increase the rigidity and toughness of the foam material.

If a thermoplastic resin is added as an additive, the resin component is preferably polyethylene, polyvinyl acetate or a copolymer of ethylene and an alkyl acrylate. The copolymers of ethylene and alkyl acrylates can include ethylene-methyl acrylate polymer, ethylene-ethyl acrylate polymer, ethylene-butyl acrylate polymer, etc., and preferred copolymers are ethylenes having alkyl acrylates with about 1 to 4 carbon atoms in the alkyl group. The thermoplastic resin may be a single compound or composition of matter or a combination of two or more compounds or compositions of matter.

If a thermoplastic resin is added, a polymerizable monomer may also be added. Suitable polymerizable monomers include triallyl cyanurate, triallyl isocyanurate, trimethylolpropane trimethacrylate and similar compounds.

By adding a reinforcing material (in powder form, chip form, fiber form, bead form, etc.), such as glass, metal or ceramic, the rigidity of the resulting foam material can be increased. Specially, if a fiber-formed material is added, the resiliency of the resulting foam material can be increased. The amount of such reinforcing materials to be added is preferably 1–300 parts by weight to 100 parts by weight of the resin component and more preferably 1–100 parts by weight.

V. Methods for Making Foam Precursor Materials

Preferably, the foam precursor material can be prepared by (1) melting the epoxy resin, (2) adding the curing agent, foaming agent and any other desired additives to the molten epoxy resin, and (3) kneading the mixture. The heating temperature for the kneading is preferably 70–130° C., and more preferably 80–120° C. The kneaded mixture can then be preferably molded into a preferred shape, such as pellets, granules, sheets or bars. The heating temperature for this molding step is preferably 80–130° C., and more preferably 80–120° C.

If a resin component other than an epoxy resin is added, the mixture can be heated above the melting point or softening point of the resin before kneading and molding the mixture, but the amount of heat should be limited to substantially avoid cross-linking or curing of the resin during the production of the foam precursor material. Generally speaking, the foam precursor material is produced in such a manner that the foaming agent does not significantly decompose and the epoxy resin does not undergo significant curing by the curing agent during the manufacturing step.

Preferably, the foam precursor materials are molded into desired shape in order to simplify handling and transport. Thus, the foam precursor materials can be used, for example, with extrusion molding techniques, injection molding techniques, compression molding techniques or other molding techniques to form the desired shapes for the foam precursor material. However, the foam precursor material also may be formed into a wide range of shapes, for example, that are useful for on-site foaming operations.

The foam precursor material preferably has a satisfactory shelf life in order to permit the foam precursor material to be stored for a reasonable amount of time while retaining curing reactivity and desired foaming properties. If an epoxy resin having about 300–4000 epoxy equivalents and a curing agent having a curing temperature of 100–200° C. are used, stable foam precursor materials can be made. For instance, using such formulas, the useful shelf life can be extended to 6 months or longer in room temperature storage.

VI. Methods of Using Foam Precursor Materials

Preferably, the foam precursor materials are cured by means of an exothermic reaction. That is, if the foam precursor material is sufficiently heated, the curing reaction will initiate and the curing reaction will proceed in a chain reaction, reaching complete expansion and curing even if subsequent heating is insufficient or uneven. By expanding and curing the foam precursor materials in this manner, hollow sections can be effectively filled. Such curing reactions are also useful for on-site foaming.

Most preferably, the foam precursor material is utilized to fill hollow sections in vehicle parts of automobiles and the like, or other types of parts. Because the foam precursor material can be molded into desired shapes, the shape of the foam precursor material can be matched to the particular shape of the hollow section of the part, so as to suitably fill that hollow section. Epoxy resin foams can also be obtained which exhibit rigidity appropriate for use as shock absorbing materials and the like to ensure stability that may be required for vehicles and other applications of the present foam materials.

As a representative method of using the present materials and methods, a foam precursor material having an appropriate shape is placed into a vehicle part having a hollow section. Both the vehicle part and the foam precursor material can be passed through a heating furnace to melt, expand and cure the epoxy resin to completely fill the hollow section. Preferably, sufficient heat is applied to the foam precursor material to raise the temperature of the foam precursor material to at least the decomposition temperature of the foaming agent, at least the melting temperature of the epoxy resin and at least the curing temperature of the curing agent. If other resin components have been included in the foam precursor material, the temperature of the foam precursor material is also raised to be at least melting or softening temperature of the other resin components. Appropriate temperature ranges are preferably between about 120–200° C., and more preferably about 130–190° C.

Because of the properties of the foam precursor material, foam materials may be produced that are suitable as packing materials, sound-absorbing materials, soundproofing materials, anti-vibration materials, structural materials, flame retardant materials and other useful materials. These foam materials may be used in homes, electrical appliances and any other situation in which the foam material is appropriate.

VII. Properties of the Foam Materials

Because the foam precursor materials contain an epoxy resin, the resulting foams exhibit satisfactory rigidity, are lightweight and have good adhesion properties with metal or glass. Such foam materials may also exhibit excellent resiliency to physical stress and thus, the foams may have excellent abrasion resistance, electrical insulating properties and molding properties.

If the foam material will be used as a shock absorbing material or structural material, the compression strength (rigidity) of the foam material is preferably about 200–2000 Kgf and more preferably about 400–1200 Kgf. 1 Kgf is equal to 9.80665 Newtons (N). Compression strength can be measured by compressing a 50 mm×50 mm×50 mm test piece using a 90-mm diameter cylinder as a compression tester. The maximum value of compression withstood by the test piece is recorded as the compression strength. Specifically, the compression strength is equal to the value of compression recorded when the test piece breaks.

Further, the toughness or resiliency of the foam material determined by calculating a ratio of (1) the compression value recorded when the test piece is compressed by 10 mm, using the compression strength protocol in the previous paragraph, over (2) the compression value recorded when the test piece breaks. The toughness ratio is preferably not less than 30% and more preferably not less than 40%.

The foam materials preferably have densities in the range of about 0.10 to 0.50 grams per cubic centimeters and more preferably, in the range of about 0.25 to 0.35 grams per cubic centimeters.

Preferably, foam materials used in vehicle parts are not only lightweight with excellent sound absorption, soundproofing, and anti-vibration properties, but also exhibit excellent shock absorption because of its rigidity. Therefore, the present foam precursor materials enable the construction of previously unknown structures. In addition, the vehicle parts may be painted during the heating process for the foam precursor material.

VIII. Representative Examples

Foams were obtained from three different foam precursor materials having the compositions shown in Table 1.

TABLE 1

|  | Content (parts by weight) |
|---|---|
| Composition 1 | |
| Epoxy resin (Epikote1001 from YUKA Shell Epoxy Co., and having an epoxy equivalents value of 500) | 100 |
| Curing agent (PN-23, an amine based curing agent from Ajinomoto) | 10 |
| Foaming agent (azodicarbonamide) | 5 |
| Talc | 50 |
| Composition 2 | |
| Epoxy resin (EpototeYD-118P from Toto Kasei K.K., and having an epoxy equivalents value of 1000) | 100 |
| EVA | 30 |
| Curing agent (2PZ, an imidazole-based curing agent from Sikoku Kasei K.K.) | 10 |
| Foaming agent (azodicarbonamide) | 5 |
| Composition 3 | |
| Epoxy resin (Epikote1003 from YUKA Shell Epoxy Co., and having an epoxy equivalents value of 750) | 100 |
| Curing agent (AH-62, an amine based curing agent from Ajinomoto) | 20 |
| Foaming agent (p-toluenesulfonyl hydrazide) | 8 |
| Glass resin (length: 6 mm) | 10 |

The foam precursor material of Composition 1 was produced by melting the epoxy resin at 70° C., adding the prescribed amounts of the curing agent, foaming agent and talc and kneading, extruding the mixture into the form of pellets. Extrusion molding techniques were utilized. The foam precursor material of Composition 2 was produced in the same manner, except that the epoxy resin was melted at 95° C. The foam precursor material of Composition 3 also was produced in the same manner, except that the epoxy resin was melted at 85° C. In each case, the extruded pellets were molded into 10 mm×100 mm×50 mm sheets using injection-molding techniques at a temperature of 100° C.

The resulting three foam precursor materials were then heated in a 170° C. oven for about 15 minutes. As a result, foams A–C were obtained from the foam precursor materials of Compositions 1–3, respectively. Foams A–C had foam ratios of 6 times, 4 times and 4.5 times, respectively, compared to the foam precursor materials. The densities of the foams were 0.25 g/cm$^3$, 0.30 g/cm$^3$ and 0.30 g/cm$^3$, respectively.

A 50 mm×50 mm×50 mm square test piece was cut from each of the three different foams, and was compressed using the 90-mm diameter cylinder described above. The maximum compression value was recorded for each foam as the compression strength, and the resulting compression strength was taken as the rigidity value. The results are listed below in Table 2.

TABLE 2

| Foam type | Rigidity value (Kgf) |
|---|---|
| Foam A | 400 |
| Foam B | 500 |
| Foam C | 1200 |

After allowing each of the foam precursor materials of Compositions 1 through 3 to stand for six months at room temperature (23±2° C.), each foam precursor material was heated to expand and cure the foam precursor material under the same conditions. As a result, all the foams exhibited foaming or expansion ratios equivalent to the foaming or expansion ratios of the foam materials that were produced immediately after making the foam precursor materials. All the foams produced from the stored foam precursor material also exhibited rigidity values equivalent to the rigidity values immediately after production. Thus, these results demonstrate that the foam precursor materials A–C have a useful shelf life of at least 6 months at room temperature, because both the foaming ratio and rigidity of the resulting foam material were substantially preserved.

What is claimed is:

1. A method for making a molded foam precursor material comprising:
    softening an epoxy resin having an epoxy equivalents value of about 500–2500;
    adding a curing agent and a foaming agent to the softened epoxy resin to form an epoxy mixture;
    kneading the epoxy mixture; and
    molding the epoxy mixture into a three-dimensional shape substantially corresponding to a hollow section of a vehicle part without significantly curing the epoxy mixture using a molding method selected from the group consisting of extrusion molding, injection molding and compression molding, the resulting molded foam precursor being substantially stable and holding its molded three-dimensional shape when stored at room temperature.

2. A method as in claim 1, wherein the epoxy resin has a melting temperature of at least 70° C.

3. A method as in claim 1, wherein the epoxy mixture is kneaded at a temperature of 70° C.–130° C.

4. A method as in claim 3, wherein the epoxy mixture is molded at a temperature of 80° C.–130° C.

5. A method as in claim 4, wherein the molded foam precursor material is a heat curable, but a substantially stable solid at room temperature.

6. A method as in claim 5, wherein the molded foam precursor material is heat curable between 120° C.–200° C. and is substantially stable at temperatures below 50° C.

7. A method as in claim 6, wherein the epoxy resin is a bisphenol epoxy resin.

8. A method as in claim 7, wherein the curing agent is selected from the group consisting of amine based curing agents, imidaxole based curing agents and monethylamine trifluoride complexes.

9. A method as in claim 8, wherein the foaming agent is provided in an amount that imparts a foaming ratio of about 2–10 to the molded foam precursor material.

10. A method as in claim 9, wherein the molded foam precursor material is substantially stable and heat curable for 6 months when stored at temperatures less than 50° C.

11. A method as in claim 10, wherein the epoxy resin has an epoxy equivalents value of between about 500–1000.

12. A method as in claim 11, wherein the molded foam precursor material comprises 100 parts by weight of the epoxy resin, 1–25 parts by weight of the curing agent and 0.5–15 parts by weight of the foaming agent.

13. A method as in claim 12, further comprising adding to the epoxy mixture a thermoplastic resin selected from the group consisting of vinyl acetate and ethylene copolymer, ethylene and alkyl acrylate copolymer and polyethylene resin.

14. A method as in claim 12, further comprising adding to the epoxy mixture 1–50 parts by weight of at least one reinforcing material selected from the group consisting of glass, metal and ceramic.

15. A method as in claim 1, wherein the epoxy mixture comprises 100 parts by weight of epoxy resin having an epoxy equivalents value of 500, 10 parts by weight of PN-23, 5 parts by weight of azodiacarbonamide and 50 parts by weight of talc, the epoxy mixture being kneaded at a temperature of 70° C.–130° C. and molded at a temperature of 80° C.–130° C.

16. A molded foam precursor material prepared according to claim 15, wherein the molded foam precursor material is heat curable between 120–200° C. and is substantially stable at temperatures below 50° C.

17. A method as in claim 1, wherein the epoxy mixture comprises 100 parts by weight of epoxy resin having an epoxy equivalents value of 1000, 30 parts by weight of EVA, 5 parts by weight of azodiacarbonamide and 10 parts by weight of 2PZ, the epoxy mixture being kneaded at a temperature of 70° C.–130° C. and molded at a temperature of 80° C.–130° C.

18. A molded foam precursor material prepared according to claim 17, wherein the molded foam precursor material is heat curable between 120° C.–200° C. and is substantially stable at temperatures below 50° C.

19. A method as in claim 1, wherein the epoxy mixture comprises 100 parts by weight of epoxy resin having an epoxy equivalents value of 750, 20 parts by weight of AH-62, 8 parts by weight of p-toluenesulfonyl and 10 parts by weight of glass, the epoxy mixture being kneaded at a temperature of 70° C.–130° C. and molded at a temperature of 80° C.–130° C.

20. A molded foam precursor material prepared according to claim 19, wherein the molded foam precursor material is heat curable between 120° C.–200° C. and is substantially stable at temperatures below 50° C.

21. A molded foam precursor material prepared according to claim 12, wherein the molded foam precursor material is heat curable between 120° C.–200° C. and is substantially stable at temperatures below 50° C.

22. A method of making a foam re-enforced vehicle part comprising:
    disposing the molded foam precursor material of claim 21 within a hollow section of a vehicle part; and
    heating the molded foam precursor material and the vehicle part at a temperature of 120–200° C., wherein the molded foam precursor material is foamed and cured.

23. A composition of matter prepared by mixing, kneading and molding:
    an epoxy resin having an epoxy equivalents value of about 500–2500;
    a curing agent having a curing temperature of 100° C.–200° C.; and
    a foaming agent having a foaming temperature of 100° C.–200° C., wherein the composition of matter has been molded into a three-dimensional shape substantially corresponding to a hollow section of a vehicle part without significantly curing the epoxy resin using a molding method selected from the group consisting of extrusion molding, injection molding and compression molding, and wherein the composition of matter is substantially stable and holds its molded three-dimensional shape when stored at room temperature.

24. A composition of matter as in claim 23, wherein the epoxy resin has a melting temperature of at least 70° C.

25. A composition of matter as in claim 24, wherein the composition of matter is substantially stable and reactive for 6 months when stored at temperatures less than 50° C.

26. A composition of matter as in claim 25, wherein the epoxy resin has an epoxy equivalents value of between about 500–1000.

27. A composition of matter as in claim 26, comprising 100 parts by weight of the epoxy resin, 1–25 parts by weight of the curing agent and 0.5–15 parts by weight of the foaming agent.

28. A composition of matter as in claim 27, further comprising 1–50 parts by total weight of at least one additive selected from the group consisting of thermosetting resins, thermoplastic resins, inorganic additives, reactive dilutive compositions, curing accelerators, foaming aids, flame retardants, coloring agents and reinforcing materials.

29. A composition of matter as in claim 23, comprising 100 parts by weight of epoxy resin having an epoxy equivalents value of 500, 10 parts by weight of PN-23, 5 parts by weight of azodiacarbonamide and 50 parts by weight of talc.

30. A composition of matter as in claim 23, comprising 100 parts by weight of epoxy resin having an epoxy equivalents value of 1000, 30 parts by weight of EVA, 10 parts by weight of 2PZ and 5 parts by weight of azodiacarbonamide.

31. A composition of matter as in claim 23, comprising 100 parts by weight of epoxy resin having an epoxy equivalents value of 750, 20 parts by weight of AH-62, 8 parts by weight of p-toluenesulfonyl and 10 parts by weight of glass resin.

32. A method of making a foam re-enforced vehicle part comprising:

disposing the composition of matter of claim 27 within a hollow section of a vehicle part; and heating the composition of matter and the vehicle part at a temperature of 120° C.–200° C., wherein the composition of matter is foamed and cured.

33. A method of making a foam re-enforced vehicle part comprising:

disposing the composition of matter of claim 23 within a hollow section of a vehicle part; and heating the composition of matter and the vehicle part at a temperature of 120° C.–200° C., wherein the composition of matter is foamed and cured.

* * * * *